(12) United States Patent
Verplancke et al.

(10) Patent No.: US 12,379,613 B2
(45) Date of Patent: Aug. 5, 2025

(54) ELECTRO-OPTICAL COMPONENT

(71) Applicants: IMEC VZW, Leuven (BE); Universiteit Gent, Ghent (BE)

(72) Inventors: Rik Verplancke, De Pinte (BE); Herbert De Smet, Destelbergen (BE)

(73) Assignees: IMEC VZW, Leuven (BE); Universiteit Gent, Ghent (BE)

(*) Notice: Subject to any disclaimer, the term of this patent is extended or adjusted under 35 U.S.C. 154(b) by 0 days.

(21) Appl. No.: 18/549,114

(22) PCT Filed: Mar. 8, 2022

(86) PCT No.: PCT/EP2022/055880
§ 371 (c)(1),
(2) Date: Sep. 5, 2023

(87) PCT Pub. No.: WO2022/189426
PCT Pub. Date: Sep. 15, 2022

(65) Prior Publication Data
US 2024/0151990 A1 May 9, 2024

(30) Foreign Application Priority Data
Mar. 11, 2021 (EP) .................................. 21162105

(51) Int. Cl.
*G02C 7/08* (2006.01)
*G02C 7/04* (2006.01)
*G02F 1/1339* (2006.01)

(52) U.S. Cl.
CPC ............ *G02C 7/083* (2013.01); *G02C 7/041* (2013.01); *G02F 1/13396* (2021.01); *G02C 2202/20* (2013.01)

(58) Field of Classification Search
None
See application file for complete search history.

(56) References Cited

U.S. PATENT DOCUMENTS

| 4,904,063 A * | 2/1990 | Okada ........................ G02F 1/29 349/200 |
| 2004/0114087 A1* | 6/2004 | Cho .................. G02F 1/133514 349/155 |

(Continued)

FOREIGN PATENT DOCUMENTS

| EP | 2530511 A1 | 12/2012 |
| EP | 3499299 A1 | 6/2019 |

(Continued)

OTHER PUBLICATIONS

PCT International Search Report and Written Opinion, application No. PCT/EP2022/055880, mailed Jun. 17, 2022, 11 pages.

(Continued)

*Primary Examiner* — Ryan Crockett
(74) *Attorney, Agent, or Firm* — McDonnell Boehnen Hulbert & Berghoff LLP

(57) ABSTRACT

Example embodiments relate to an electro-optical component. One embodiment includes an electro-optical component for adaptive visual correction. The component includes a first transparent substrate. The component also includes a second transparent substrate. Additionally, the component includes an optical structure disposed on the first transparent substrate. Further, the component includes a liquid-crystal gap located between the optical structure and the second transparent substrate. Even further, the component includes a first transparent electrode and a second transparent electrode located on opposite sides of the liquid-crystal gap. Still further, the component includes a plurality of spacers located in the liquid-crystal gap between the second transparent substrate and the optical structure. The plurality of spacers includes at least one spacer having a different height than another spacer of the plurality of spacers.

20 Claims, 7 Drawing Sheets

(56) References Cited

U.S. PATENT DOCUMENTS

| | | | | |
|---|---|---|---|---|
| 2014/0092350 | A1* | 4/2014 | Byeon | G02F 1/1339 |
| | | | | 349/155 |
| 2016/0170097 | A1* | 6/2016 | Milton | G02C 7/041 |
| | | | | 349/200 |
| 2016/0216602 | A1* | 7/2016 | Choi | G02F 1/136286 |
| 2016/0231607 | A1* | 8/2016 | Wu | G02F 1/133305 |
| 2016/0282668 | A1* | 9/2016 | Kang | G02F 1/133514 |
| 2018/0107044 | A1* | 4/2018 | Fang | G02F 1/133371 |
| 2020/0201112 | A1* | 6/2020 | De Smet | G02F 1/1337 |
| 2021/0072438 | A1* | 3/2021 | Marchal | G02B 5/1895 |
| 2023/0119885 | A1* | 4/2023 | Oag | G02C 7/04 |
| | | | | 349/13 |
| 2023/0134662 | A1* | 5/2023 | Usukura | G06F 1/163 |
| | | | | 349/13 |

FOREIGN PATENT DOCUMENTS

| | | | |
|---|---|---|---|
| JP | 2006293241 A | 10/2006 | |
| JP | 2012068359 A | 4/2012 | |
| JP | 2014182330 A | 9/2014 | |

OTHER PUBLICATIONS

Vanhaverbeke, Celine, Rik Verplancke, Jelle De Smet, Dieter Cuypers, and Herbert De Smet. "Microfabrication of a spherically curved liquid crystal display enabling the integration in a smart contact lens." Displays 49 (2017): 16-25.

De Smet, Jelle, Aykut Avci, Pankaj Joshi, David Schaubroeck, Dieter Cuypers, and Herbert De Smet. "Progress toward a liquid crystal contact lens display." Journal of the Society for Information Display 21, No. 9 (2013): 399-406.

* cited by examiner

ELECTRO-OPTICAL COMPONENT

CROSS-REFERENCE TO RELATED APPLICATIONS

The present application is a national stage entry of PCT/EP2022/055880 filed Mar. 8, 2022, which claims priority to EP 21162105.7 filed on Mar. 11, 2021, the contents of each of which are hereby incorporated by reference.

TECHNICAL FIELD

The present disclosure relates to an electro-optical component for adaptive visual correction, to a contact lens comprising the same, and to methods for manufacturing the same.

BACKGROUND

Presbyopia is an age-related disorder which affects the accommodation capability of the eyes. One possible treatment of presbyopia lies in the use of smart contact lenses which comprise electro-optical components for adaptive visual correction. Such an electro-optical component typically comprises liquid crystals. Such a component comprising liquid crystals may comprise two substrates separated by a small gap. Through activation of the liquid crystals in the gap, the visual correction of the electro-optical component may be adapted, helping with accommodation.

It is a challenge to prevent substrate sagging, which could adversely affect the optical properties of the electro-optical component. Conventionally, so-called "spacers" of equal length are used in the liquid-crystal gap, typically being located at ridges of the optical structure.

SUMMARY

The present disclosure provides an electro-optical component for adaptive visual correction providing better control of the liquid-crystal gap distance.

Some embodiments provide an electro-optical component for adaptive visual correction, comprising a first transparent substrate; a second transparent substrate; an optical structure disposed on the first transparent substrate; a liquid-crystal gap located between the optical structure and the second transparent substrate; a first transparent electrode and a second transparent electrode, located on opposite sides of the liquid-crystal gap; and a plurality of spacers located in the liquid-crystal gap between the second transparent substrate and the optical structure, wherein the plurality of spacers comprises at least one spacer having a different height than another spacer of the plurality of spacers.

A liquid-crystal cap should be understood as a gap filled with liquid crystals, or a gap to be filled with liquid crystals.

As a consequence of the liquid-crystal gap being located between the optical structure and the second transparent substrate, the optical structure is in contact with, and/or is configured to be in contact with, the liquid crystals of the liquid-crystal gap. As a further consequence, the optical structure is located adjacent to the liquid-crystal gap.

The plurality of spacers comprising at least one spacer having a different height than another spacer, i.e., there being spacers of different height, allows for a freer placement of spacers throughout the liquid-crystal gap. For example, instead of just having the option of placing constant height spacers at apices of the optical structure, such as ridges, bulges, or the like, as conventionally done, spacer placement may be optimized to prevent sagging of the second transparent substrate or of the first transparent substrate, in particular when the substrates are not rigid, because they are very thin and/or made of flexible material. Additionally, this may be particularly useful for constant-height Fresnel-lenses, where sagging otherwise may become a problem due to the relatively large distances between apices near the center of the lens. At a given location where a spacer is to be placed to prevent sagging, the spacer height may be chosen to that the spacer is just long enough to keep the desired distance and resulting gap between both substrates. This may result in a better control over the cell gap, which is particularly beneficial if using very thin (e.g. 50 μm thickness) and/or flexible substrates. Therefore, it may be possible to use thinner and/or more flexible substrates than otherwise possible, allowing, for example, for a thinner and/or lighter contact lens.

According to an embodiment, the electro-optical component has a curved shape. A curved shape should be understood as the layers of the electro-optical component, instead of forming parallel planes, each having a convex shape, while still being locally parallel or essentially locally parallel. In some embodiments, the curved shape may be a spherically curved shape.

Electro-optical components with curved geometries may be used in some embodiments for integrating into a scleral contact lens, allowing the thickness of the latter to be reduced due to the lens better following the curved shape of the eye. Electro-optical components with curved geometries are a particularly beneficial application of the present disclosure, due to the particular challenge of preventing sagging in a curved geometry.

According to an embodiment, the optical structure comprises a central bulge or indent and a plurality of ridges located radially outside the central bulge or indent, wherein the plurality of spacers comprises a plurality of different-height spacers located at the central bulge or indent; and a plurality of constant-height spacers, one spacer of the plurality of constant-height spacers being located at each of the ridges.

The central bulge or indent is typical of, e.g., Fresnel lens structures.

A spacer being located "at" a ridge should be understood as the spacer terminating anywhere on the ridge. In some embodiments, the spacer may terminate at the apex of the ridge.

Through the plurality of different-height spacers located at the central bulge or indent, sagging in such a region may be prevented, while easier-to-manufacture constant-height spacers may be used at the ridges, which typically are closer spaced and therefore less prone to sagging.

According to an embodiment, the optical structure comprises a central bulge or indent and a plurality of ridges located radially outside the central bulge or indent, wherein the plurality of spacers comprises a plurality of different-height spacers located at the central bulge or indent; and a second plurality of spacers, each spacer of the second plurality of spacers being located at a respective ridge of the plurality of ridges, wherein each of the spacers of the second plurality of spacers is located at a same radial distance from a respective apex of the respective ridge.

Through the plurality of different-height spacers being located at the central bulge or indent, sagging in such a region may be prevented. Meanwhile, placing the spacers of the second plurality of spacers at a same radial distance from the respective ridge apex allows easier placement of the spacers of the second plurality of spacers, thus allowing for a less complicated design.

According to an embodiment, a spacer of the plurality of spacers has a rounded cross section. For example, the rounded cross section may be circular. This minimizes the contact area with the liquid crystal, less disturbing the alignment of the liquid-crystal molecules, allowing for a better-functioning electro-optical component.

According to an embodiment, the optical structure is a Fresnel lens structure. Such a lens structure typically comprises bulges, indents, and/or ridges, wherein application of the present disclosure is particularly beneficial.

Some embodiments provide a contact lens comprising the electro-optical component of the present disclosure. The contact lens may, in some embodiments, be a scleral contact lens.

Some embodiments provide a method of manufacturing the electro-optical component for adaptive visual correction according to the above, comprising applying a plurality of successive photolithographic layers to a substrate, wherein at least one of the spacers is produced from at least one of the plurality of layers.

According to an embodiment, each layer is a photo-imageable spin-on layer, such as an SU-8 layer.

According to an embodiment, the substrate is the second transparent substrate. This reduces the number of manufacturing steps, allowing for easier manufacturing, especially in small volumes.

According to an embodiment, the substrate is a master mold and the method further comprises molding at least part of the second transparent substrate based on the master mold. The molding of the at least part of the second transparent substrate based on the master mold may be direct, or indirect through one or more intermediate molds.

Producing a master mold based on which at least part of the second transparent substrate is molded allows, for the creation of several master molds, allowing for straightforward scaling up of manufacturing.

According to an embodiment, the master mold is a positive master mold. A positive mold should be understood as a mold where the features of which directly correspond to the features of the final spacers, i.e., a convex feature of the mold corresponds to a convex feature of the spacer. Using a positive master mold may make the master mold easier to produce.

According to an embodiment, the master mold is a negative master mold. A negative mold should be understood as a mold where the features of which are inverted compared to the features of the final spacers, i.e., a convex feature of the mold corresponding to a concave feature of the spacer.

Another embodiment provides a method of manufacturing the electro-optical component for adaptive visual correction according to the above, comprising producing a substrate comprising a plurality of spacers; and creating the second transparent substrate by removing material from at least one spacer on the substrate.

This allows for an almost continuous range of spacer heights, increasing flexibility.

Some embodiments provide a method of manufacturing the electro-optical component for adaptive visual correction according to the above, comprising calculating a maximum value for a distance from any point in the liquid-crystal gap to a nearest spacer in the plurality of spacers based on material properties of the first transparent substrate and the second transparent substrate; and distributing the plurality of spacers in two dimensions throughout the liquid-crystal gap so that each such distance is below the maximum distance.

In some embodiments, such material properties may be material type, thickness, Young's modulus, and/or maximum thermoforming temperature.

By calculating the maximum distance based on material properties, rather than, e.g., only the geometry, the spacer arrangement may be optimized for the specific combination of geometry and materials at hand. Hereby, better control of the liquid-crystal gap may be achieved, which may make it possible to use thinner and/or more flexible substrates than otherwise possible, allowing in some embodiments for a thinner and/or lighter contact lens.

BRIEF DESCRIPTION OF THE DRAWINGS

The present disclosure will be better understood through the following illustrative and non-limiting detailed description, with reference to the appended drawings. In the drawings like reference numerals will be used for like elements unless stated otherwise.

DETAILED DESCRIPTION

Figure 1A:
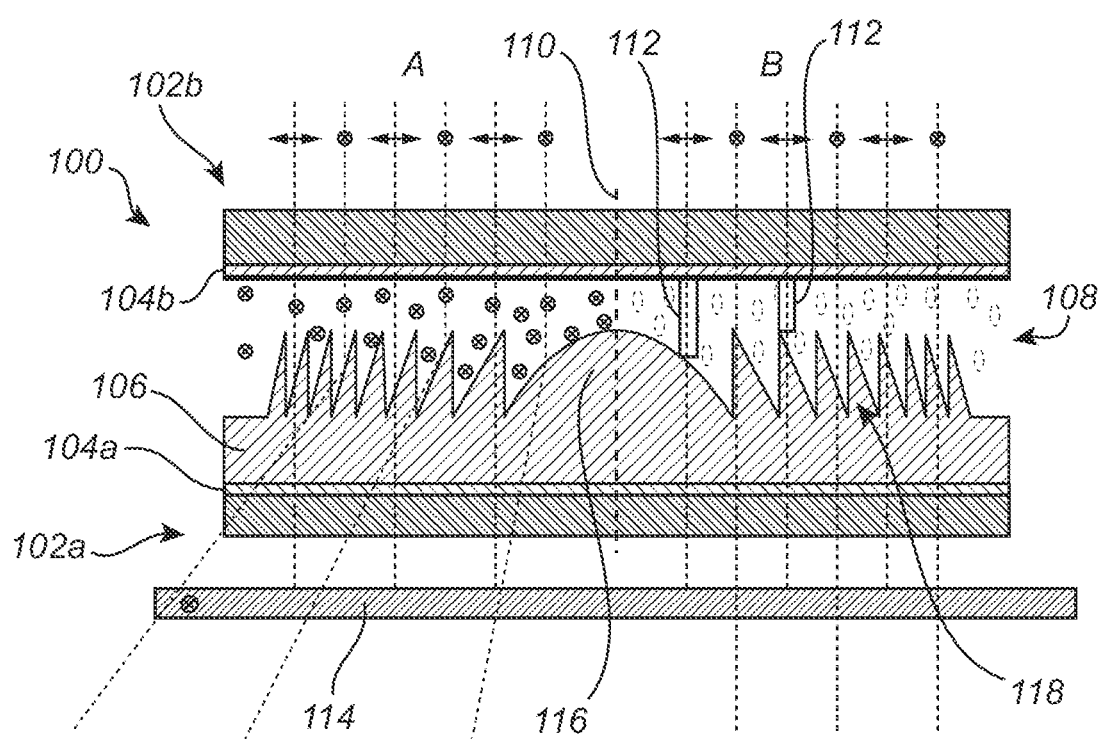
FIG. 1A shows an electro-optical component, according to example embodiments.

FIG. 1A shows an electro-optical component 100 for adaptive visual correction.

In some embodiments, the electro-optical component 100 may be integrated into a contact lens, which, for example, may be a so-called smart contact lens. The contact lens may deal with the treatment of presbyopia, which is the age-related reduced accommodation capability of the eyes. To re-enable a person to accommodate vision (i.e. change the focus of the eye depending on the distance to the scene that is observed), the electro-optical component 100 may be integrated into the contact lens which allows, for example, for switching between two or more focal powers. For example, the contact lens may be able to switch between two focal powers, e.g., plano and minus 2 diopter (−2D).

In some embodiments, the electro-optical component may have a thickness of approximately 120 μm and a diameter of 7 mm.

The electro-optical component 100 may, as shown, be rotationally symmetric around an axis 110, with FIG. 1A showing a cross section therethrough.

In a sandwiched layer configuration, the electro-optical component 100 comprises, in order, a first transparent substrate 102a, a first transparent electrode 104a, an optical structure 106, a liquid-crystal gap 108, which may be filled with liquid crystals, a second transparent electrode 104b, and a second transparent substrate 102b.

The first transparent substrate 102a and the second transparent substrate 102b may be made of relatively thin and/or flexible materials. For example, the first transparent substrate 102a and the second transparent substrate 102b may be made of plastic films, e.g., PET, PMMA, or TAC.

For simplicity and clarity, the electro-optical component 100 of FIG. 1A, is shown in a straight configuration, i.e., the sandwiched layers lying in parallel planes. However, curved configurations are equally possible, as is described below in conjunction with FIG. 1B. All configurations and embodiments throughout this disclosure should be understood as applicable to such curved configurations.

In some embodiments, the optical structure 106 may be considered a micro-optical structure.

As shown, the optical structure 106 may be a Fresnel lens structure and may comprise a central bulge 116 (as shown) or a central indent (as will be described elsewhere below), and a plurality of concentric ridges 118 located radially outside the central bulge 116.

The first transparent electrode 104a and the second transparent electrode 104b are located on opposite sides of the liquid-crystal gap 108. As shown, the first transparent electrode 104a and the second transparent electrode 104b may, respectively, be integrated into and/or onto the first transparent substrate 102a and the second transparent substrate 102b. Other configurations (not shown) with the one or both of the first transparent electrode 104a and/or the second transparent electrode 104b being separate from the respective substrate 102a, 102b are equally possible. For example, the first transparent electrode 104a could be integrated into the optical structure 106, and/or be placed on the optical structure 106.

Further as shown, the optical structure 106 is disposed on the first transparent substrate 102a.

The liquid-crystal gap 108 is formed between the optical structure 106 and the second transparent substrate 102b and may, with the device in use, be filled with liquid crystals.

In some embodiments, the electro-optical component 100 may be coupled to a polarizer 114, not forming part of the electro-optical component 100.

The electro-optical component 100 is a liquid-crystal device comprising two transparent substrates 102a, 102b, of which one substrate 102a is covered with a micro-optical structure 106, with a thin liquid-crystal gap 108 in between. When the electro-optical component is use, the liquid-crystal gap 108 may be filled with liquid crystals, thus forming a thin liquid-crystal layer. Transparent electrodes 104a, 104b on both substrates are able to generate an electric field inside the liquid crystal present in the liquid-crystal gap 108.

The optical structure 106 is thus located adjacent to the liquid-crystal gap 108. When the liquid-crystal gap 108 is filled with liquid crystals, consequently, the optical structure 106 is contact with the liquid crystals of the liquid-crystal gap 108. Thus, the optical structure 106 is configured to be in contact with the liquid crystals of the liquid-crystal gap 108.

The micro-optical structure 106 may be designed in such a way that in combination with the birefringent nature of the liquid crystals of the liquid-crystal gap 108, the electro-optical component 100 has a tunable lens functionality for one polarization state of light transmitted therethrough, as shown by dashed lines in FIG. 1A. By switching the liquid-crystal device "on" (=voltage on, FIG. 1A, part B) or "off" (=voltage off, FIG. 1A, part A), the cell is able to switch between two focal powers, e.g., plano and minus 2 diopter (−2D).

In some embodiments, in order to create a component that has tunable lens functionality for all light transmitted, regardless of the polarization state, two such electro-optic elements 100 can be stacked orthogonally on top of each other.

As is schematically shown in FIG. 1A, a plurality of spacers 112 is located in the liquid-crystal gap 108, and thus between the second transparent substrate 102b and the optical structure 106. The plurality of spacers 112 comprises at least one spacer having a different height than another spacer of the plurality of spacers 112, as will be elaborated upon in the following.

Figure 1B:
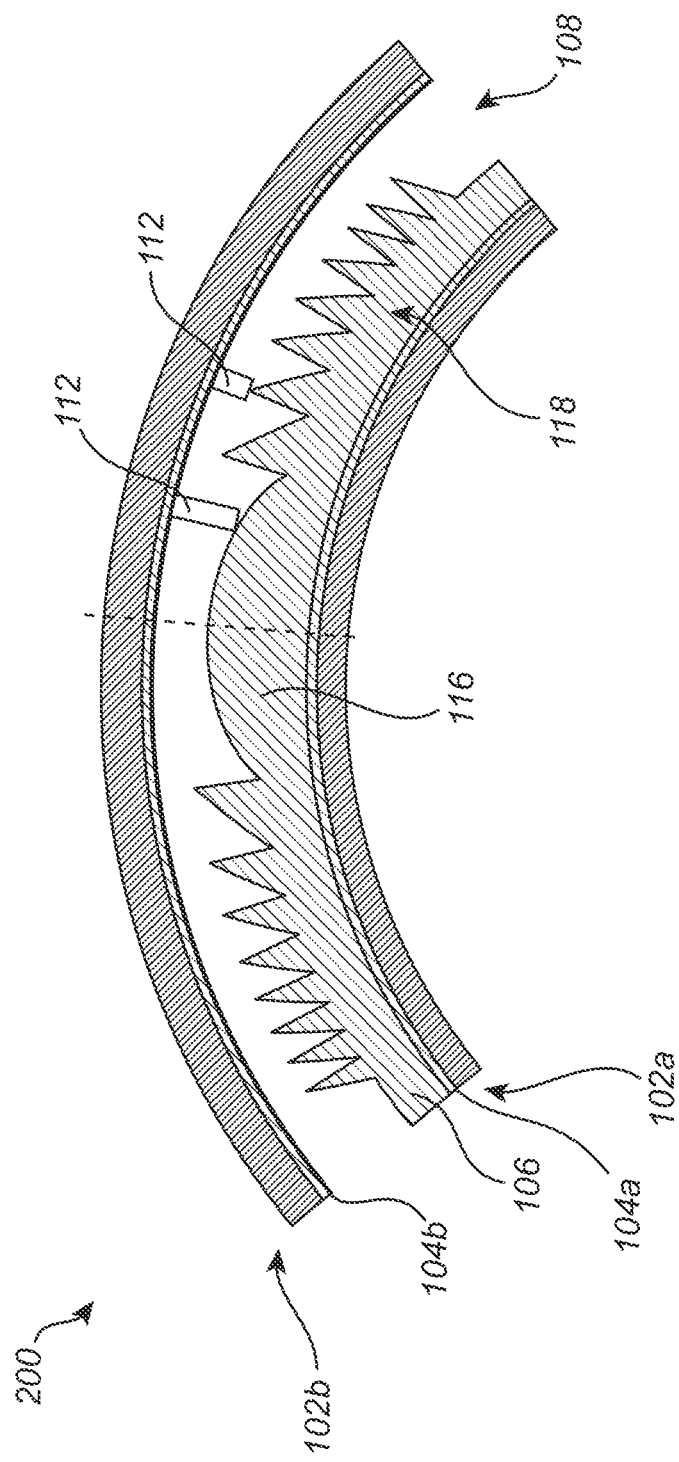
FIG. 1B shows an electro-optical component having a curved shape, according to example embodiments.

FIG. 1B shows an electro-optical component 200 having a curved shape. The curved shape is typically rotationally symmetric and may be a spherically curved shape. Apart from the curved shape, the electro-optical component 200 has the same features as described above for the electro-optical component 100 of FIG. 1A.

In some embodiments, the manufacturing of such an electro-optical component 200 having a curved shape may comprise a transition from a flat state to a spherically curved state. In some embodiments, the transition may be by thermoforming, where a flat disc is inserted into a set of heated molds which are used to transform the flat disc into the spherically curved shape.

Figure 2A:
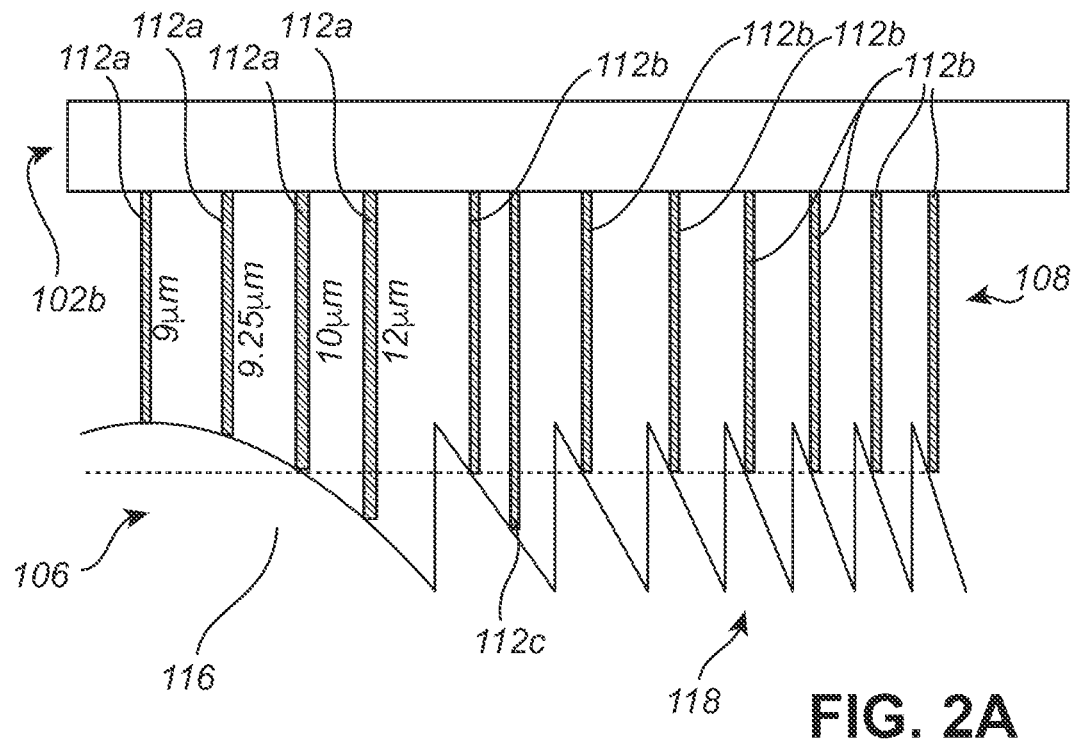
FIG. 2A shows a first spacer configuration, according to example embodiments.
Figure 2B:
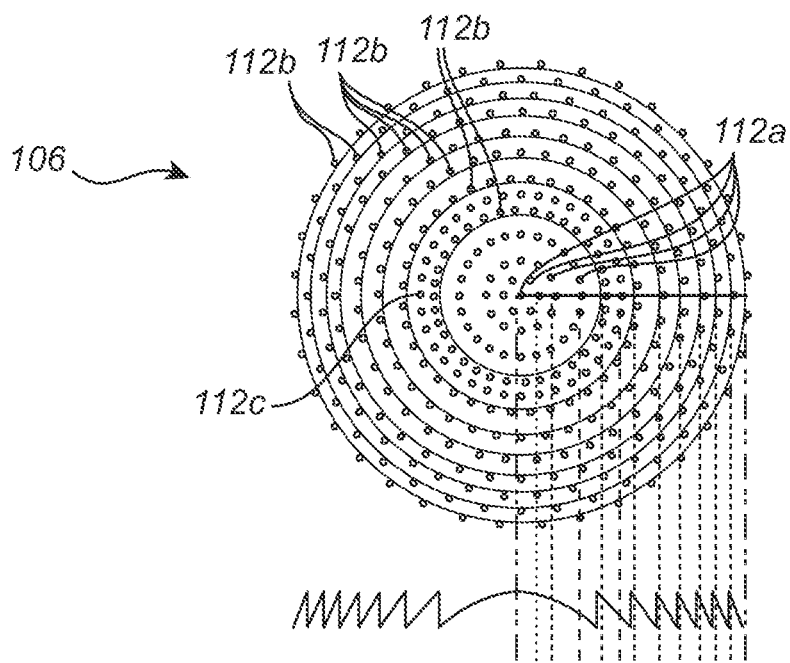
FIG. 2B shows a first spacer configuration, according to example embodiments.

FIGS. 2A and 2B show a first spacer configuration in the liquid-crystal gap 108 between the optical structure 106 and the second transparent substrate 102b, which may form part of the electro-optical components 100, 200 disclosed above in conjunction with FIGS. 1A and 1B. As described above, the optical structure may comprise a central bulge 116 and a plurality of concentric ridges 118 located radially outside the central bulge, as typical for a Fresnel lens structure. FIG. 2A shows the radial disposition of the spacers while FIG. 2B shows the structure from above.

A plurality of spacers 112 is located in the liquid-crystal gap. In particular, the plurality of spacers comprises a plurality of different-height spacers 112a located at the central bulge 116 (or indent, cf. FIG. 4), and a plurality of constant-height spacers 112b, one spacer 112b of the plurality of constant-height spacers being located at each of the ridges of the plurality of concentric ridges 118.

For simplicity, all spacers are shown in a same radial cross-sectional view in FIG. 2A. However, as is evident from FIG. 2B, at each radial position, the spacers may be disposed at different circumferential position, for example to be evenly distributed circumferentially.

In the embodiment of FIG. 2A, the plurality of different-height spacers at the central bulge comprises four spacers with respective lengths of 9, 9.25, 10, and 12 micrometers, following the contour of the central bulge 116. Naturally, other specific arrangements of different-height spacers 112a are possible within the teachings of the present disclosure.

Further, still with reference to the embodiment of FIG. 2A, the plurality of constant-height spacers 112b at the plurality of ridges 118 may comprise spacers of length 10 micrometers. Other lengths are possible in other embodiments.

In some embodiments, it may be beneficial for one or more of the radially innermost ridges to comprise further spacers apart from the plurality of constant-length spacers 112b. In the example of FIG. 2A, the radially innermost ridge has one further spacer 112c of length 12 micrometers.

Figure 2C:
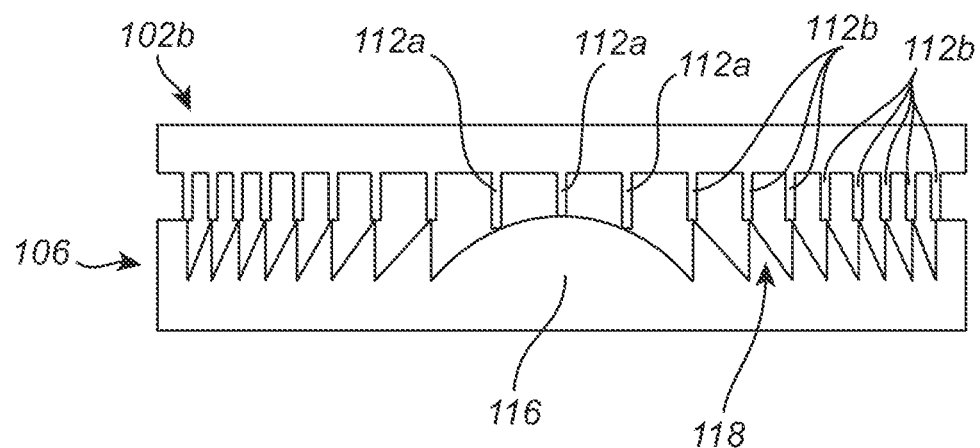
FIG. 2C shows a first spacer configuration, according to example embodiments.

FIG. 2C shows, schematically, a similar arrangement as in FIGS. 2A and 2B, comprising a plurality of spacers, which further comprises a plurality of different-height spacers 112a located at the central bulge 116 (or indent, cf. FIG. 4); and a plurality of constant-height spacers 112b, one spacer 112b of the plurality of constant-height spacers being located at each of the ridges of the plurality of concentric ridges 118. In this example each spacer 112b of the plurality of constant-height spacer is located at an apex of the respective ridge.

Figure 3A:
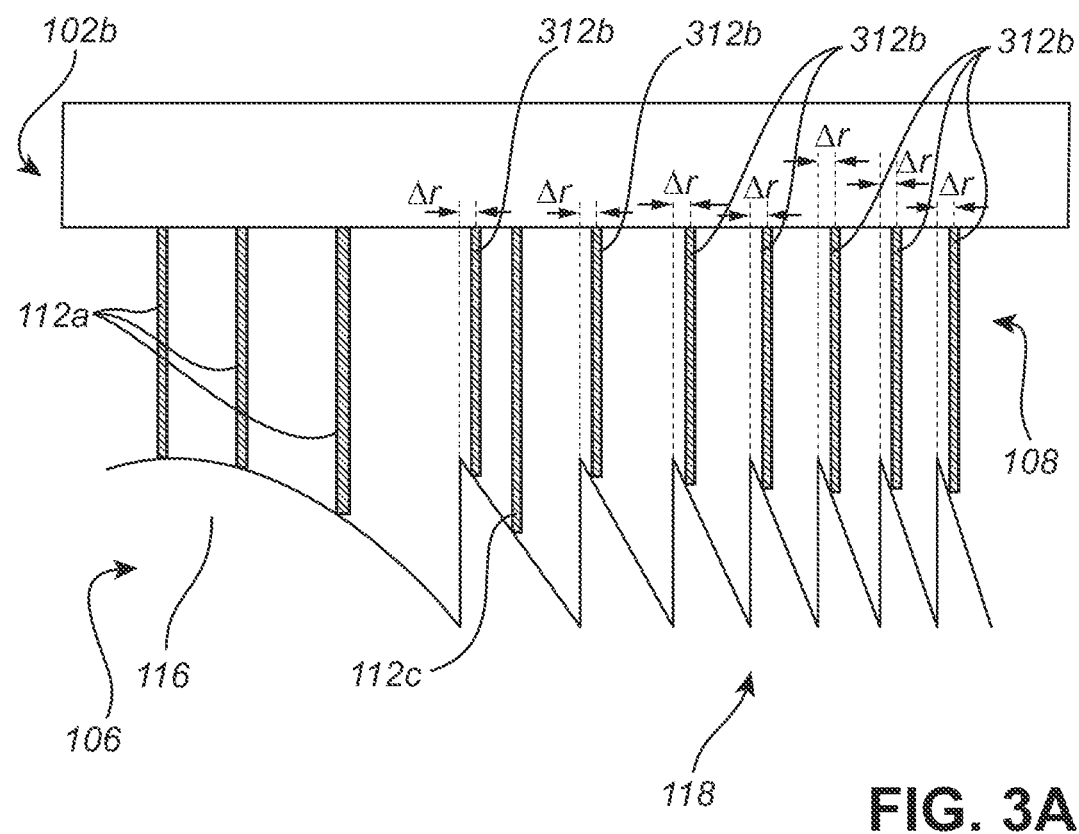
FIG. 3A shows a second spacer configuration, according to example embodiments.
Figure 3B:
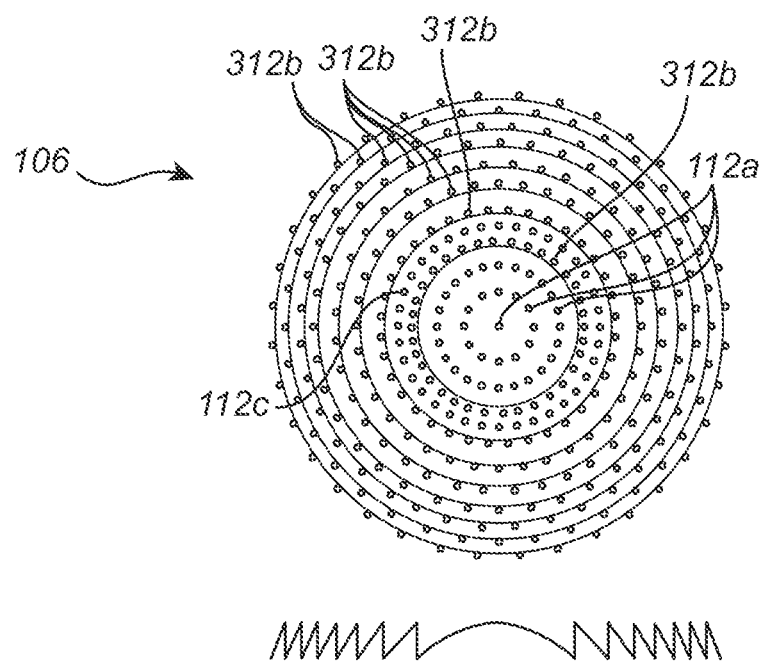
FIG. 3B shows a second spacer configuration, according to example embodiments.

FIGS. 3A and 3B show a second spacer configuration, wherein, just as for FIGS. 2A and 2B discussed above, FIG. 3A shows the radial disposition of the spacers while FIG. FIG. 3B shows the structure from above.

Just as above, the second spacer configuration is formed in the liquid-crystal gap 108 between the optical structure 106 and the second transparent substrate 102b, which may form part of the electro-optical components 100, 200 disclosed above in conjunction with FIGS. 1A and 1B. As described above, the optical structure may comprise a central bulge 116 and a plurality of concentric ridges 118 located radially outside the central bulge, as typical for a Fresnel lens structure.

A plurality of spacers 112 is located in the liquid-crystal gap. The plurality of spacers comprises a plurality of different-height spacers 112a located at the central bulge 116—the concept is equally applicable to a central indent— and a second plurality of spacers 312b, one spacer 312b of the second plurality of spacers being located at each of the ridges of the plurality of concentric ridges 118. Furthermore, each of the spacers 312b of the second plurality of spacers is located at a same radial distance Ar from the apex of the respective ridge.

For simplicity, all spacers are shown in a same radial cross-sectional view in FIG. 3A. However, as is evident from FIG. 3B, at each radial position, the spacers may be disposed at different circumferential position, for example to be evenly distributed circumferentially.

In the example of FIG. 3A, the plurality of different-height spacers at the central bulge comprises three spacers with different lengths, following the contour of the central bulge 116. Naturally, other specific arrangements of different-height spacers 112a are possible within the teachings of the present disclosure.

In some embodiments, it may be beneficial for one or more of the radially innermost ridges to comprise further spacers apart from the second plurality of spacers 312b. In the example of FIG. 3A, the radially innermost ridge has one further spacer 112c.

Figure 4:
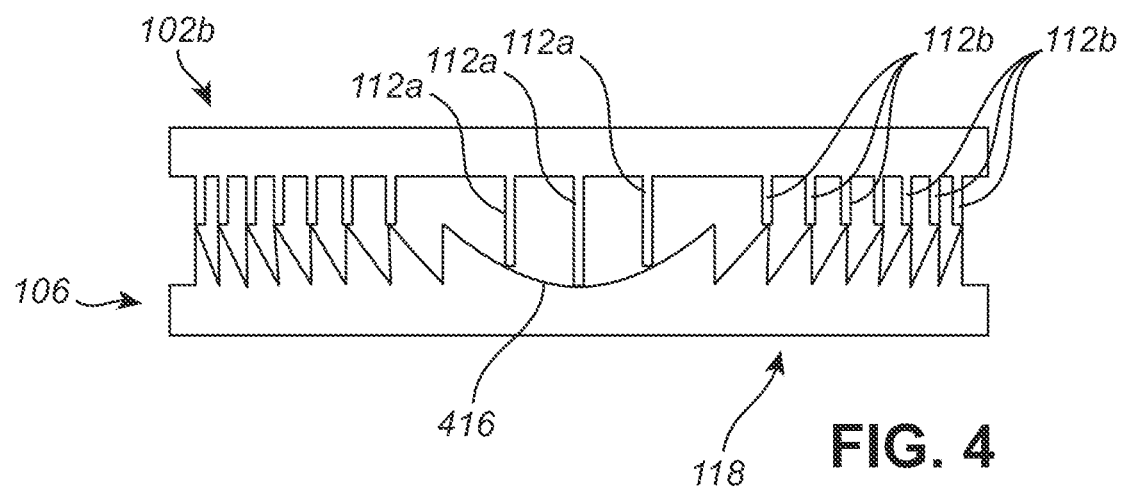
FIG. 4 shows an optical structure comprising a central indent, according to example embodiments.

FIG. 4 shows an optical structure 106 comprising a central indent 416 instead of a central bulge 116 (cf. FIGS. 1A-3B). Other features are as disclosed above in conjunction with FIGS. 2A-3B.

In some embodiments, the spacers as disclosed above in conjunction with FIGS. 1A-4 may each have a rounded cross section, e.g., a circular cross section, wherein each spacer thereby being cylindrical.

Methods of manufacturing the electro-optical components disclosed above will be described below.

In some embodiments, spacers may be manufactured though a molding process, in one or more steps.

Figure 5A:
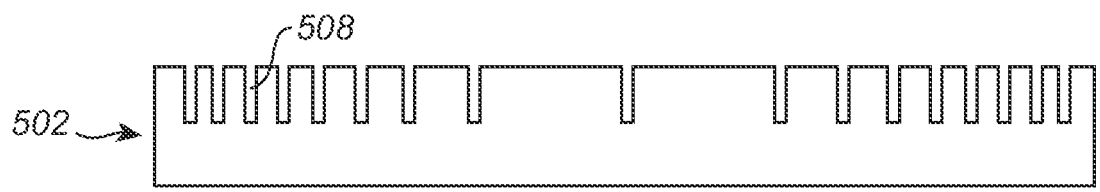
FIG. 5A shows a mold for manufacturing spacers of the electro-optical component, according to example embodiments.

For example, the spacers may be molded from a negative master mold 502, as illustrated in FIG. 5A, with recesses 508 corresponding to the spacers to be molded.

Figure 5B:
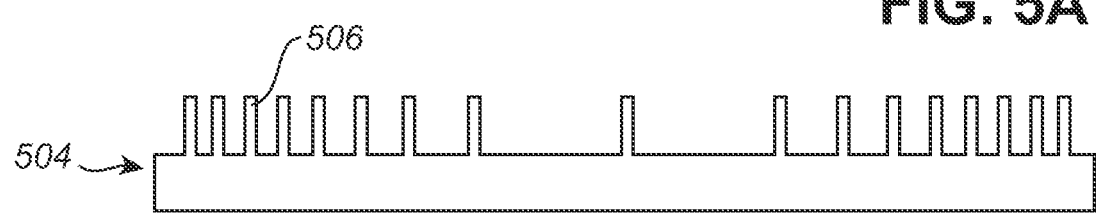
FIG. 5B shows a mold for manufacturing spacers of the electro-optical component, according to example embodiments.

Alternatively, the spacers may be molded from a positive master mold 504, as illustrated in FIG. 5B, with features 506 of the mold 504 directly corresponding in shape to the spacers to be molded.

Figure 6:
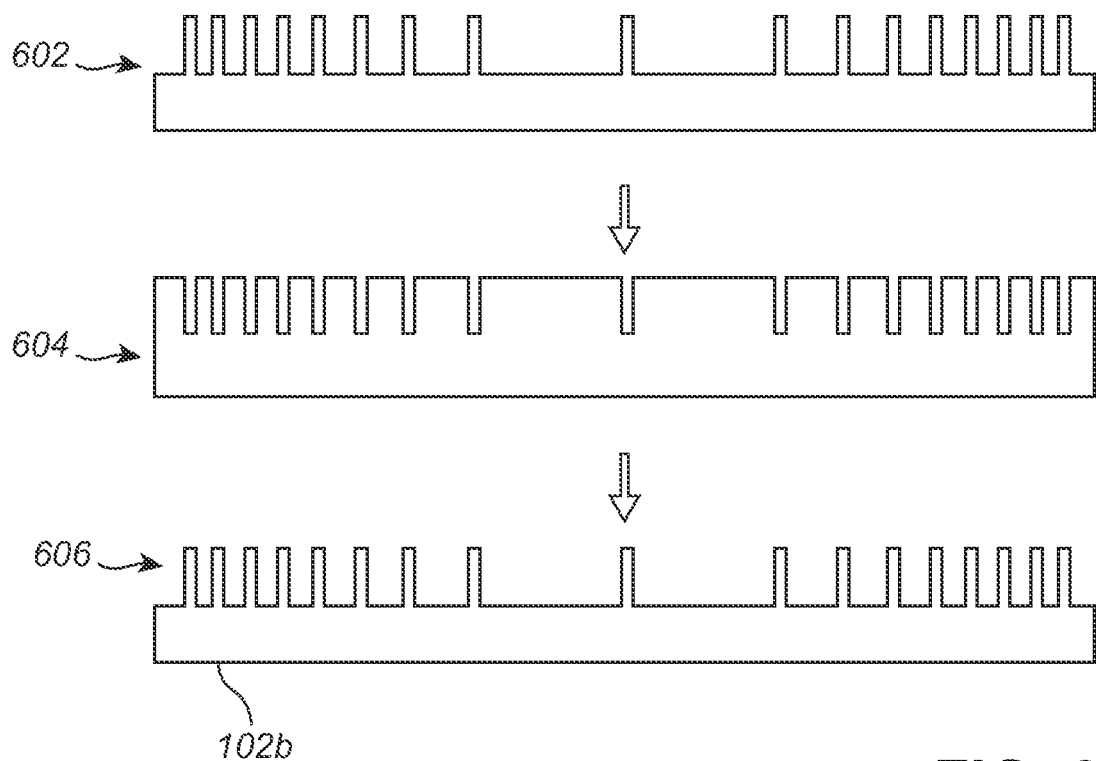
FIG. 6 illustrates molding the spacers from a positive master mold, according to example embodiments.

This is further illustrated in FIG. 6, showing an example of a molding procedure. First, a positive master mold 602 is created, in some embodiments using one or more of the methods described below. Then, a negative intermediate mold 604 is molded from the positive master mold 602. Finally, the final spacers 606 may be molded from the negative intermediate mold 604, whereby the spacers, for example, are embossed on the second transparent substrate 102b.

The master mold 602 may, in some embodiments, be a silicon wafer containing SU-8 features. By replica molding using polydimethylsiloxane (PDMS), the intermediate negative mold 604 can be created. This replica can in turn be used to emboss other (transparent) materials on the substrates used in the electro-optical component.

In other words, the master mold may be inverted or "negative" in which case the spacers will be inverted (i.e. recesses), cf. FIG. 5A. The master mold can also be "positive", cf. FIGS. 5B and 6, in which case the embossing will be a two-step procedure, whereby an intermediate negative mold will first be cast from the original positive master mold and subsequently used to emboss the actual substrate used in the electro-optical component. Thereby, at least part of the second transparent substrate is molded based on the master mold.

In some embodiments, another method to manufacture placed spacers of different height is to use a sequence of multiple photolithographic steps using photo-imageable spin-on layers (e.g. SU-8), whereby different layer thicknesses are used for the consecutive steps. In every step, the spacers with a certain desired height corresponding to the thickness of the spin coated layer are produced.

Thus, the manufacturing method comprises applying a plurality of successive photolithographic layers to a substrate, wherein the at least one spacer is produced from at least one of the plurality of layers.

This method can be directly applied to the second transparent substrate 102b on which the spacers are to be created. Alternatively, the method may be applied to a different substrate, the different substrate thereby becoming a master mold, in particular a positive master mold, as described above.

Figure 7:
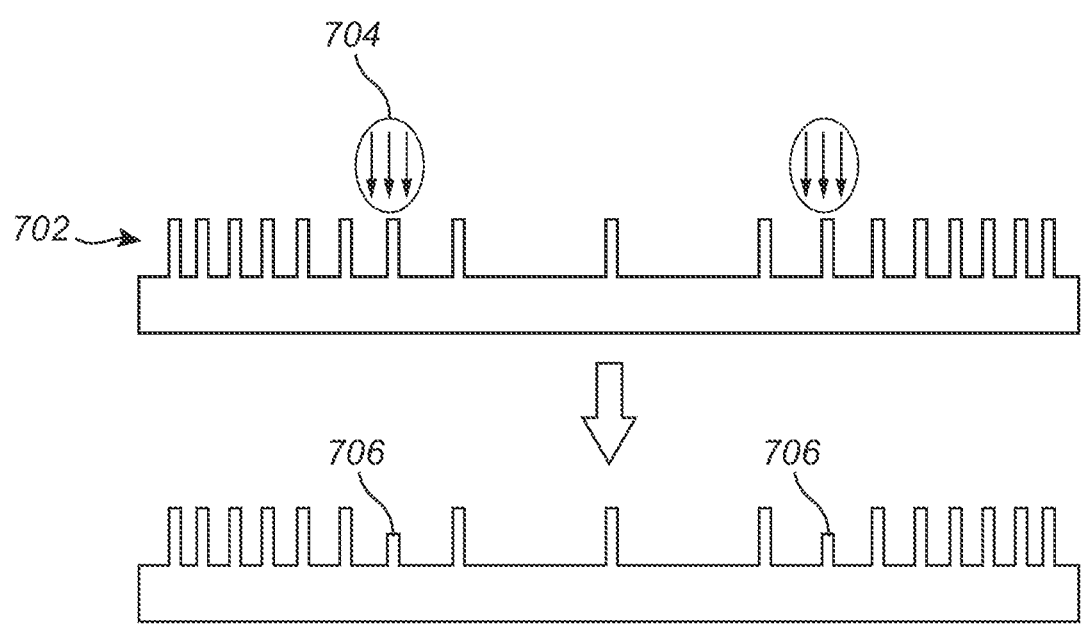
FIG. 7 illustrates laser ablation, according to example embodiments.

Another method to manufacture placed spacers of different heights is illustrated in FIG. 7, involving first producing plurality of spacers 702, which in some embodiments may be of a larger height than is needed and subsequently making one or more of the plurality of spacers 706 shorter using a technique 704 to remove material from the top of certain spacers. In some embodiments, such a technique may be laser ablation. This allows for a large, an almost continuous range of spacer heights, increasing flexibility.

In some embodiments, this method can also be directly applied to the substrate on which the spacers are to be created. For example, an extra layer may be spin coated on the second transparent substrate 102b. Alternatively, the method may be applied to create a positive master mold, as described above. The method may also be used to create a negative master mold by creating recesses of different depth in a uniform layer that is subsequently used to emboss the actual substrate that will be used in the electro-optical component.

In some embodiments, the placing of the spacers in the liquid-crystal gap may be based on calculating a maximum value for a distance from any point in the liquid-crystal gap to a nearest spacer in the plurality of spacers based on material properties of the first transparent substrate and the second transparent substrate, and then distributing the plurality of spacers in two dimensions throughout the liquid-crystal gap so that each such distance is below the maximum distance. In some embodiments, such material properties may be material type, thickness, Young's modulus, and/or maximum thermoforming temperature.

In the above the disclosure has mainly been described with reference to a limited number of examples. However, other embodiments than the ones described above are equally possible within the scope of the disclosure, as defined by the appended claims.

The invention claimed is:

1. An electro-optical component for adaptive visual correction, comprising:
a first transparent substrate;
a second transparent substrate;
an optical structure disposed on the first transparent substrate, wherein the optical structure comprises a central bulge or indent and a plurality of ridges located radially outside the central bulge or indent;
a liquid-crystal gap located between the optical structure and the second transparent substrate;
a first transparent electrode and a second transparent electrode, located on opposite sides of the liquid-crystal gap; and
a plurality of spacers located in the liquid-crystal gap between the second transparent substrate and the optical structure, wherein each spacer of the plurality of spacers fully extends between the second transparent substrate and the optical structure,
wherein the plurality of spacers comprises at least one spacer having a different height than another spacer of the plurality of spacers, and
wherein the plurality of spacers comprises:
a plurality of different-height spacers located at the central bulge or indent; and
(i) a plurality of constant-height spacers, one spacer of the plurality of constant-height spacers being located at each of the ridges; or
(ii) a second plurality of spacers, each spacer of the second plurality of spacers being located at a respective ridge of the plurality of ridges, wherein each of the spacers of the second plurality of spacers is located at a same radial distance from a respective apex of the respective ridge.

2. The electro-optical component of claim 1, wherein the component has a curved shape.

3. The electro-optical component of claim 1, wherein the plurality of spacers comprises
a plurality of constant-height spacers, one spacer of the plurality of constant-height spacers being located at each of the ridges.

4. The electro-optical component of claim 1, wherein the plurality of spacers comprises
a second plurality of spacers, each spacer of the second plurality of spacers being located at a respective ridge of the plurality of ridges, wherein each of the spacers of the second plurality of spacers is located at a same radial distance from a respective apex of the respective ridge.

5. The electro-optical component of claim 1, wherein a spacer of plurality of spacers has a rounded cross section.

6. The electro-optical component of claim 1, wherein the optical structure is a Fresnel lens structure.

7. The electro-optical component of claim 1, wherein a contact lens comprises the component.

8. A method of manufacturing the electro-optical component for adaptive visual correction of claim 1,
wherein the method comprises applying a plurality of successive photolithographic layers to a substrate,
wherein each layer of the plurality of successive photolithographic layers has a different layer thickness, and
wherein at least one spacer is produced from at least one of the plurality of layers.

9. The method of claim 8, wherein each layer is a photo-imageable spin-on layer.

10. The method of claim 8, wherein the substrate is the second transparent substrate.

11. The method of claim 8, wherein the substrate is a master mold and the method further comprises molding at least part of the second transparent substrate based on the master mold.

12. The method of claim 11, wherein the master mold is a positive master mold.

13. The method of claim 11, wherein the master mold is a negative master mold.

14. The method of claim 9, wherein each layer is an SU-8 layer.

15. A method of manufacturing the electro-optical component for adaptive visual correction of claim 1, comprising:
producing a substrate comprising a plurality of spacers; and
creating the second transparent substrate by removing material from at least one spacer on the substrate using laser ablation.

16. A method of manufacturing the electro-optical component for adaptive visual correction of claim 1, comprising:
calculating a maximum value for a distance from any point in the liquid-crystal gap to a nearest spacer in the plurality of spacers based on material properties of the first transparent substrate and the second transparent substrate; and
distributing the plurality of spacers in two dimensions throughout the liquid-crystal gap so that each such distance is below the maximum distance.

17. A method of manufacturing an electro-optical component for adaptive visual correction,
wherein the electro-optical component comprises:
a first transparent substrate;
a second transparent substrate;
an optical structure disposed on the first transparent substrate, wherein the optical structure comprises a central bulge or indent and a plurality of ridges located radially outside the central bulge or indent;
a liquid-crystal gap located between the optical structure and the second transparent substrate;
a first transparent electrode and a second transparent electrode, located on opposite sides of the liquid-crystal gap; and
a plurality of spacers located in the liquid-crystal gap between the second transparent substrate and the optical structure, wherein each spacer of the plurality of spacers fully extends between the second transparent substrate and the optical structure, wherein the plurality of spacers comprises at least one spacer having a different height than another spacer of the plurality of spacers, wherein the plurality of spacers comprises:
- a plurality of different-height spacers located at the central bulge or indent; and
  - (i) a plurality of constant-height spacers, one spacer of the plurality of constant-height spacers being located at each of the ridges; or
  - (ii) a second plurality of spacers, each spacer of the second plurality of spacers being located at a respective ridge of the plurality of ridges, wherein each of the spacers of the second plurality of spacers is located at a same radial distance from a respective apex of the respective ridge, wherein the method comprises applying a plurality of successive photolithographic layers to a substrate, and wherein at least one spacer is produced from at least one of the plurality of layers.

18. The method of claim 17, wherein each layer is a photo-imageable spin-on layer.

19. The method of claim 18, wherein the substrate is the second transparent substrate.

20. A method of manufacturing an electro-optical component for adaptive visual correction, wherein the electro-optical component comprises:
- a first transparent substrate;
- a second transparent substrate;
- an optical structure disposed on the first transparent substrate, wherein the optical structure comprises a central bulge or indent and a plurality of ridges located radially outside the central bulge or indent;
- a liquid-crystal gap located between the optical structure and the second transparent substrate;
- a first transparent electrode and a second transparent electrode, located on opposite sides of the liquid-crystal gap; and
- a plurality of spacers located in the liquid-crystal gap between the second transparent substrate and the optical structure, wherein each spacer of the plurality of spacers fully extends between the second transparent substrate and the optical structure, wherein the plurality of spacers comprises at least one spacer having a different height than another spacer of the plurality of spacers, wherein the plurality of spacers comprises:
- a plurality of different-height spacers located at the central bulge or indent; and
  - (i) a plurality of constant-height spacers, one spacer of the plurality of constant-height spacers being located at each of the ridges; or
  - (ii) a second plurality of spacers, each spacer of the second plurality of spacers being located at a respective ridge of the plurality of ridges, wherein each of the spacers of the second plurality of spacers is located at a same radial distance from a respective apex of the respective ridge, and wherein the method comprises:
- producing a substrate comprising a plurality of spacers; and
- creating the second transparent substrate by removing material from at least one spacer on the substrate.

* * * * *